United States Patent

Mikkor

[11] 4,226,923
[45] Oct. 7, 1980

[54] VOLUME EFFICIENT SODIUM SULFUR BATTERY

[75] Inventor: Mati Mikkor, Ann Arbor, Mich.

[73] Assignee: Ford Motor Company, Dearborn, Mich.

[21] Appl. No.: 89,060

[22] Filed: Oct. 29, 1979

[51] Int. Cl.³ .............................................. H01M 6/18
[52] U.S. Cl. ................................................... 429/104
[58] Field of Search ................. 429/104, 149, 153, 72, 429/101, 102

[56] References Cited

U.S. PATENT DOCUMENTS

| 3,533,848 | 10/1970 | Winn | 429/104 X |
| 3,679,480 | 7/1972 | Brown et al. | 429/104 |
| 3,837,918 | 9/1974 | Nakabayashi | 429/104 |
| 3,891,943 | 5/1974 | Minck et al. | 429/104 |
| 3,932,195 | 1/1976 | Evans et al. | 429/104 |
| 4,038,462 | 7/1977 | Rohr | 429/104 X |
| 4,049,885 | 9/1977 | Mitoff | 429/104 |

*Primary Examiner*—Anthony Skapars

*Attorney, Agent, or Firm*—William E. Johnson; Keith L. Zerschling

[57] ABSTRACT

In accordance with the teachings of this specification, a sodium sulfur battery is formed as follows. A plurality of box shaped sulfur electrodes are provided, the outer surfaces of which are defined by an electrolyte material. Each of the electrodes have length and width dimensions substantially greater than the thicknesses thereof as well as upwardly facing surface and a downwardly facing surface. An electrode structure is contained in each of the sulfur electrodes. A holding structure is provided for holding the plurality of sulfur electrodes in a stacked condition with the upwardly facing surface of one sulfur electrode in facing relationship to the downwardly facing surface of another sulfur electrode thereabove. A small thickness dimension separates each of the stacked electrodes thereby defining between each pair of sulfur electrodes a volume which receives the sodium reactant. A reservoir is provided for containing sodium. A manifold structure interconnects the volumes between the sulfur electrodes and the reservoir. A metering structure controls the flow of sodium between the reservoir and the manifold structure.

4 Claims, 3 Drawing Figures

VOLUME EFFICIENT SODIUM SULFUR BATTERY

STATEMENT

The invention herein-described was made in the course of or under contract or subcontract with the Department of Energy, namely, Contract #EY-76-C-02-2566.

BACKGROUND OF THE INVENTION AND PRIOR ART STATEMENT

In the last decade, a great deal of work has been done by the scientific community on alkali metal secondary battery systems. The most worked upon system has been the sodium sulfur secondary battery. In this case, sodium is used as a liquid anode and sulfur is used as a liquid cathode. A solid electrolyte is provided which is conductive to ions of the liquid anode. Suitable electric terminals are used to put power into the battery to recharge the same or to withdraw power during discharging thereof.

In a normal discharge operation, individual sodium atoms give up an electron to the external circuit, pass through the electrolyte as a sodium ion, and react with the sulfur of the cathode which has received the electron from the external circuit to form sodium sulfur reaction products. During recharge, the sodium sulfur reaction products give up electrons to the external circuit, thus producing sodium ions. These sodium ions pass through the electrolyte and are recombined with the electrons in the anode compartment to once again form sodium.

During discharge of the sodium sulfur cell, it is desirable to have at least enough sodium available to convert all of the sulfur in the cathode compartment to Na2S3. If enough sodium is not available, the discharge will terminate early (when all sodium is exhausted) before the average melt composition in cathode has reached Na2S3. This results in decrease of the energy of the cell or reduced energy density. However, in the sodium sulfur system one does not desire to keep a large amount of the anode material available in the vicinity of the sulfur in the cathode compartment because if the compartment wall is ruptured, these materials may intermix and cause a heating of the battery that may damage the material holding the battery together.

It is therefore a principal object of this invention to provide a volume efficient sodium sulfur battery system in which a substantial amount of the sodium anode material is available during discharge of the battery, but the sodium is kept available for the reaction in such a manner that there is not a large volume of the sodium reactant located adjacent the compartments in which the sulfur reactant is stored.

In the recharging of a sodium sulfur battery system, generally the cathode compartment will contain sulfur and decreasing amounts of sodium polysulfide materials. The sulfur, which is lighter than the polysulfide materials, is a material which is not electrically conductive. During recharging, the sulfur forms at the electrolyte graphite felt interface in the cathode compartment. If this electrically insulating sulfur film is not removed and replaced with conductive sodium polysulfide material, the recharging process of the battery is effectively terminated.

It is therefore another principal object of this invention to provide a volume efficient sodium sulfur battery in which polysulfide materials in the cathode compartment are constantly moved into contact with at least part of the electrolyte associated therewith during the recharging of the battery by a gravity feed mechanism. This insures that so long as sodium polysulfide materials are contained in the cathode compartment, they will be available adjacent the electrolyte for the purpose of carrying out the recharging operation. In the recharging operation, the sodium polysulfide material gives up electrons to the external circuit to produce sodium ions which migrate through the electrolyte to be reassociated with the electrons in the anode compartment to once again form sodium.

U.S. Pat. No. 3,932,195 issued Jan. 13, 1976 for "Electric Cells", discloses a sodium sulfur battery cell in which an extended surface area current collector is sandwiched between facing portions of a solid electrolyte also of extended surface area. The solid electrolyte provides a container for liquid sulfur. Sulfur is generally located in contact with most of the area of the electrolyte for the purpose of carrying out the reversible electrochemical reaction with the sulfur contained in the cathode compartment. Several figures of the drawing suggest construction of the cell in a manner in which a plurality of rectangular cathode sulfur containing compartments are provided in various configurations.

U.S. Pat. No. 3,811,943 issued May 21, 1974 for a "Mass Transportation Electrode for Energy Conversion Device", shows a structure useful in a sodium sulfur battery. In this construction, a container 10 is used to contain sodium which is conducted by means of plurality of electrolyte tubes 20—20 into reactive association with sulfur contained in a second container indicated by the numeral 14.

SUMMARY OF THE INVENTION

This invention relates to a sodium sulfur battery and, more particularly, to a sodium sulfur battery in which during the discharge thereof sodium is continuously fed to the zone or zones of the battery in which it is used as a reactant. During the charging of the battery, the structure provides a manner in which sodium polysulfide material may move into contact with the electrolyte between the sodium and sulfur compartments by gravity action.

In accordance with the teachings of this invention, a sodium sulfur battery is formed as follows. A plurality of box shaped sulfur electrodes are provided. The outer surfaces of each of these sulfur electrodes are defined by an electrolyte material. Each of the electrodes have length and width dimensions substantially greater than the thicknesses thereof. As an additional characteristic of this construction, each of the sulfur electrodes have an upwardly facing surface and a downwardly facing surface. An electrode structure is contained in each of the box shaped sulfur electrodes. The electrode structure provides electrical access from each of the sulfur electrodes to an external electric circuit.

A holding structure is provided for holding the plurality of box shaped sulfur electrodes in a stacked condition with an upwardly facing surface of one sulfur electrode in facing relationship to a downwardly facing surface of another sulfur electrode thereabove. A small thickness dimension separates each of the stacked electrodes thereby defining between each pair of upwardly facing and downwardly facing surfaces of the sulfur electrodes a volume which may receive the sodium reactant.

A reservoir device is provided for containing sodium. A manifold structure interconnects the volumes between the facing sulfur electrodes and reservoir structure. A metering structure is provided for conrolling the flow of sodium between the reservoir structure and the manifold structure.

The reservoir structure combined with the metering structure provides a means for controlling the flow of sodium to the various volumes between facing sulfur electrodes during the discharging of the battery. Thus, during the discharging of the battery, as sodium is used up, more sodium is drawn from the reservoir structure so that the discharging of the battery may continue for a prolonged period of time. This structure also provides a safety feature because only a small amount of sodium is in close association with the sulfur electrodes during any particular time. This means that if the electrolyte material breaks, there is not a great deal of sodium available for immediate reaction with the sulfur from the sulfur electrode having the broken electrolyte.

During the charging of the battery, the battery construction has advantages because the sodium polysulfide material is heavier than the sulfur. Thus, the sodium polysulfide material will by gravity tend to be moved toward the lower face of each of the sulfur electrodes. Since this lower face of each of the sulfur electrodes is in contact with a sodium containing volume, charging current may still flow into the sulfur electrode to break down the sodium polysulfide materials and recharge the battery. Thus, the battery of this construction provides a rather extensive area of electrolyte which is engaged by sodium polysulfide material during the battery recharging, the sodium polysulfide materials being moved to the electrolyte area by means of gravity flow.

BRIEF DESCRIPTION OF THE DRAWINGS

The novel features that are considered characteristic of the invention are set forth with particularity in the appended claims. The invention itself, however, both as to its organization and its method of operation, together with objects and advantages thereof, will best be understood from the following description of specific embodiments when read in connection with the accompanying drawing, wherein like reference characters indicate like parts throughout the several figures, and in which:

DESCRIPTION OF THE PREFERRED EMBODIMENT

Construction

Figure 1:
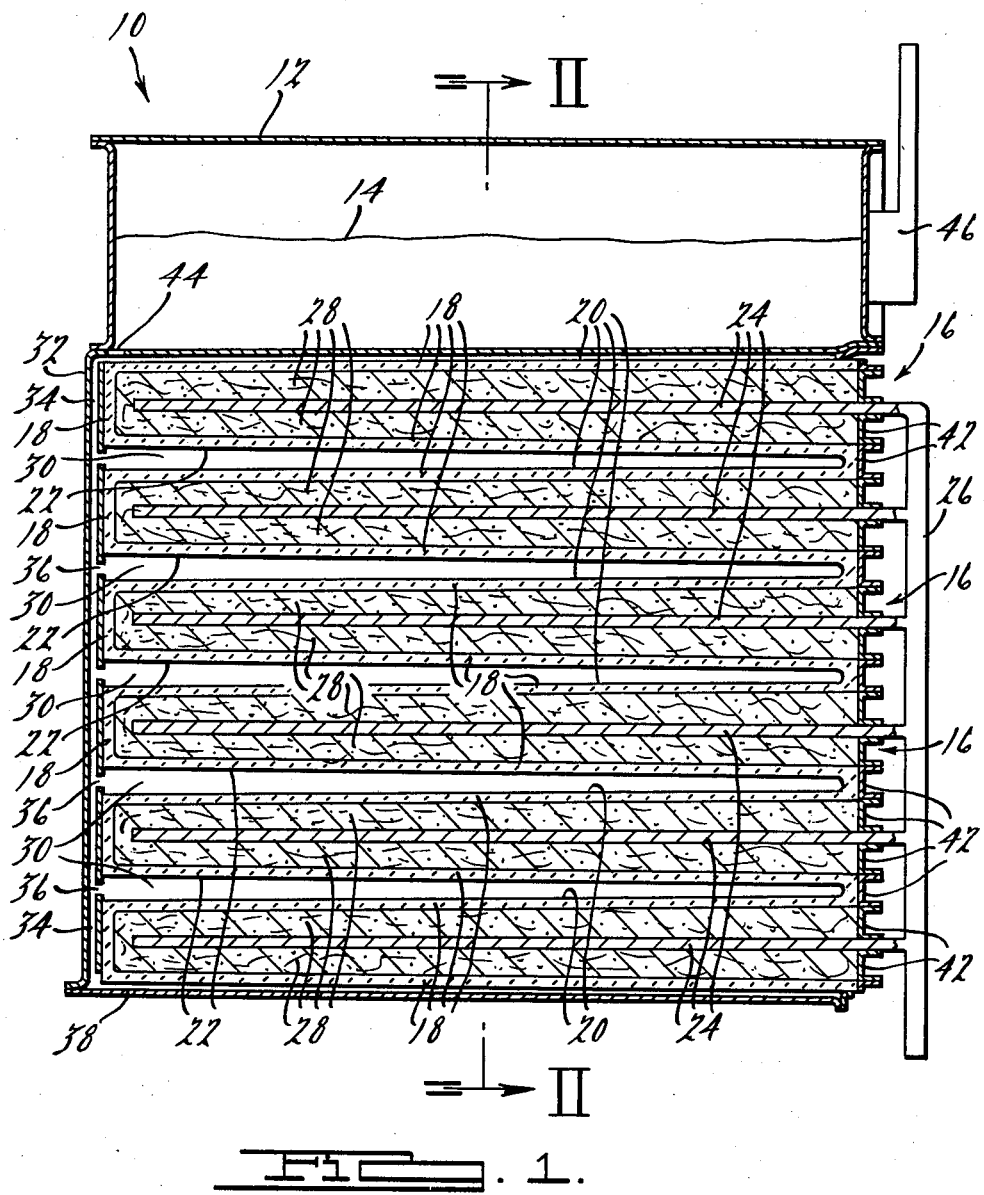
FIG. 1 is a side elevation view, in cross-section of a battery formed in accordance with the general teachings of this invention.
Figure 2:
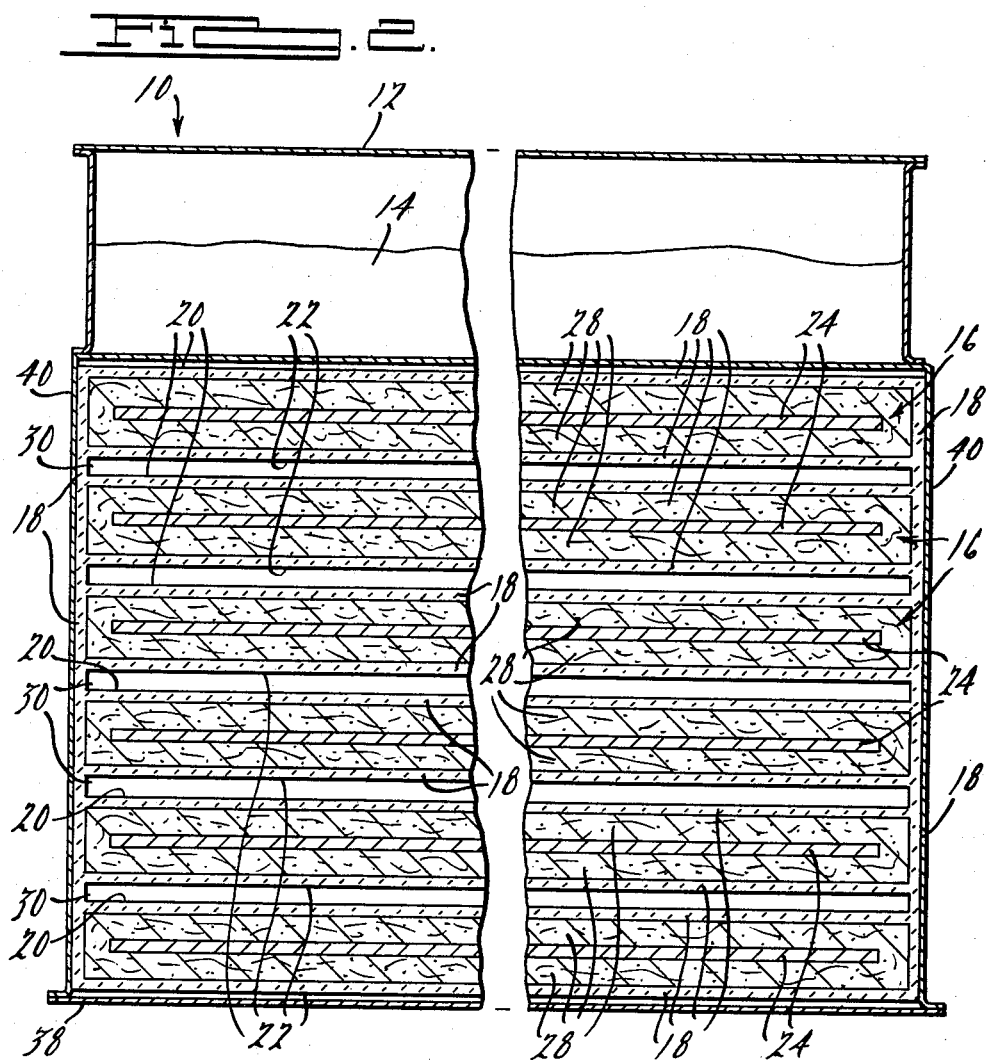
FIG. 2 is a front elevation view in cross-section of the battery of FIG. 1 taken along line 2—2 of FIG. 1.

In FIGS. 1 and 2, there is seen a sodium sulfur battery generally indentified by the numeral 10. The battery includes a sodium metal reservoir 12 containing molten sodium 14. The sodium is molten at the operational temperature of the battery. The molten sodium reservoir 12 may be made of a material such as stainless steel or a metal suitably coated so that it is non-reactive with the sodium. The metal may have a thickness of ½ mm to 1 mm, but in any regard, it should be as thin as possible and yet sufficiently thick to provide the required mechanical strength for containing the sodium metal 14 therewithin.

A plurality of box shaped sulfur electrodes are provided which are generally identified by the numeral 16. The outer surfaces of each of the electrodes are defined by plates 18 of an electrolyte material such as beta or beta" alumina. The entire shape of the outer surfaces of the electrode may be made of a single piece of electrolyte material as, for example, in an injection molding operation. On the other hand, the shape may be made by gluing several pieces of electrolyte material together to form a single unit. As is well known, this material permits the migration of sodium ions therethrough, but does not permit the movement of either molten sodium or molten sulfur therethrough. Thus, the material acts as a barrier between the sodium and sulfur compartments of a sodium sulfur battery, but it is the very means by which the battery is effective in passing sodium ions back and forth between such electrodes during the charging or discharging thereof.

In an assembled condition, the single piece or the plurality of plates of electrolyte 18 define individual box shaped sulfur electrodes 16—16. Each of these so-formed electrodes have length and width dimensions substantially greater than the thickness dimension thereof. Each of the individual electrodes 16—16 have an upwardly facing surface 20 and a downwardly facing surface 22. The plates 18 of electrolyte material have a thickness of 1 mm to 2 mm. In general, these plates should be as thin as possible, but should be thick enough to provide the required strength. The thinner the plate, the lower the cell resistance.

Each of the box shaped sulfur electrodes 16—16 have an electrode 24 contained therein for providing electrical access from each of the sulfur electrodes to an external electric circuit. A common bus bar 26, shown only in FIG. 1, is used to interconnect the plurality of electrodes 24—24. Each of the sulfur electrodes 16—16 may also contain fibrous mat material 28 known to those skilled in the art for containing sulfur which is the other reactant in the sodium sulfur cell. The fibrous mat material may also be designed so that it has properties which permit it to wick either sulfur or sodium polysulfide material in particular directions which insure the most useful charging and discharging characteristics of the cell. Many fibrous mat materials and designs for those mat materials are known to those skilled in the art, as is evidenced by the many patents which have issued in this area. These fibrous mats are generally made from some form of carbon fiber or graphite fiber.

The upwardly facing surface 20 and the downwardly facing surface 22 of associated sulfur electrodes 16—16 are generally separated by a distance of 1 mm or less to define a plurality of volumes 30—30 for receiving sodium therein. In contrast, the sulfur compartments 16—16 have a thickness in the range from 3 mm to 25 mm, depending upon the particular power requirements of the battery. The various individual volumes 30—30 which contain sodium therein are relatively small when compared with the adjacent sulfur electrode 16—16.

If the electrolyte 18 of a sulfur electrode 16 is ruptured, the interaction of the sodium and sulfur in the vicinity of that electrode will not cause a substantial heating of the battery, as would be the occasion when sulfur is permitted to interact with sodium on a large scale. Thus, by providing a plurality of small volumes 30—30 in association with the plurality of sulfur electrodes 16—16, one has increased the safety characteristics of the battery by not permitting the development of an intermixing of large amounts of unreacted sulfur and sodium.

As seen only in FIG. 1, a front enclosure member 32 made of material similar to that of a sodium metal reservoir 12 defines a manifold 34 along the front face of the plurality of stacked sulfur electrodes 16—16. This manifold 34 is interconnected with the various sodium volumes 30—30 by means of manifold openings 36—36.

Enclosure of the sodium sulfur battery 10 is accomplished by a bottom enclosure member 38 seen in FIGS. 1 and 2, along with side enclosure member 40—40 seen only in FIG. 2. As seen only in FIG. 1, the back of the sodium sulfur battery 10 is enclosed by means of a plurality of U-shaped back enclosure members 42—42 which are in contact with electrodes 24—24 and with one another. All of these aforementioned enclosure members may be made of the same material as is used to make the sodium metal reservoir 12.

A bottom of the sodium metal reservoir 12 has a metering opening 44 therein, shown only in FIG. 1. This metering opening is so sized that sodium may flow out of or into the sodium metal reservoir 12 at a rate sufficient to obtain the highest design charging or discharging rate from the battery, whichever rate has been selected to be the controlling rate.

Those skilled in the art are well aware of the particular requirements in the amount of sodium either used or generated upon the charging or discharging of the battery and therefore are able to size the metering opening 44 to obtain the required flow characteristics.

Operation

In accordance with the teachings of this invention, molten sodium 14 forms the anode material or reactant of the cell. This reactant, during the discharging of the battery, is metered through metering opening 44 in the sodium metal reservoir 12 into the manifold 34. The manifold, in turn, through the manifold openings 36—36, meters the molten sodium into the sodium volumes 30—30 between facing surfaces of the stacked sulfur electrodes 16—16.

As is well known in the art, during discharge of the sodium sulfur cell 10, the sodium gives up an electron to the external circuit through an electrode 46 and thereafter in its ionized form passes through the electrolyte 18 into one of the sulfur electrodes 16. Within the sulfur electrode 16, the sodium ion reacts with sulfur which has picked up the electron from the external circuit formed by the bus bar 26 and its associated electrode 24 to form sodium polysulfide materials.

As the discharging of the battery continues, molten sodium 14 is continuously metered out of the sodium metal reservoir 12 into the manifold 34 and thereafter through the appropriate manifold openings 36—36 to the associated volumes 30—30 for the sodium. By providing a remote supply of sodium, the discharge reaction may continue for a period of time until all of the sulfur in the sodium electrode 16—16 is used. Also, by providing a more remote source of anodic sodium metal, there is a limited amount of sodium available in each of the sodium volumes 30—30 if the electrolyte 18 associated with a particular sulfur electrode is damaged. If such damage occurs and there is an intermixing of sulfur from the electrode and sodium in its associated volume, there is little danger of rapid heating of the battery because there is such a small amount of sodium available adjacent the sulfur electrode for reaction purposes.

Upon recharging of the battery, the polysulfide materials break down to give up electrons to the associated electrode 24 which, in turn, delivers those electrons to the bus bar 26. The sodium ions produced by the breakdown of polysulfide materials migrate through the electrolyte material to once again be located in a volume 30—30 for sodium associated with each of the sulfur electrodes 16—16. The electrons which have been delivered to the bus bar 26 are brought back into association with the sodium ions as they flow by means of electrode 46 into the sodium metal reservoir 12. As the molten sodium is reformed, it takes a reverse flow path through the manifold opening 36—36 into the manifold 34 and thereafter through metering opening 44 into the sodium metal reservoir 12 to once again replenish the sodium contained therein. The diameter or area of the metering opening 44 is designed so as to accommodate the highest rate of charging or discharging envisioned in the battery's usage. The rate of charge or discharge will govern the rate of consumption or replenishment of molten sodium and the opening should be sized to handle the flow rate desired at that maximum discharge rate or recharge rate of the battery.

Also, upon recharging of the battery, the molten polysulfide materials, which break down to produce sulfur and the sodium ions which travel through the electrolyte, is a material which has a density greater than the density of sulfur. Thus, the sodium polysulfide materials, by natural flow processes, tend to flow toward the bottom of each individual sulfur electrode 16. This means that the downwardly facing surfaces 22—22 of each of the sulfur electrode 16—16 will generally have sodium polysulfide materials associated therewith by means of gravity flow. Thus, during recharging of the battery, at least the downwardly facing surfaces 22—22 will have sodium polysulfide materials in contact therewith for the purpose of carrying out the reversible electrochemical reaction which results in the breakdown of these materials.

Thus, the construction of this battery is one in which sodium polysulfide materials are brought by gravity flow into contact with an electrode area. This gravity flow permits recharging of the battery back to the point where all of the sodium polysulfide materials are used up and the battery is once again in a condition which generally pure sulfur is contained in each of the sulfur electrodes 16—16.

Alternate Embodiment

Figure 3:
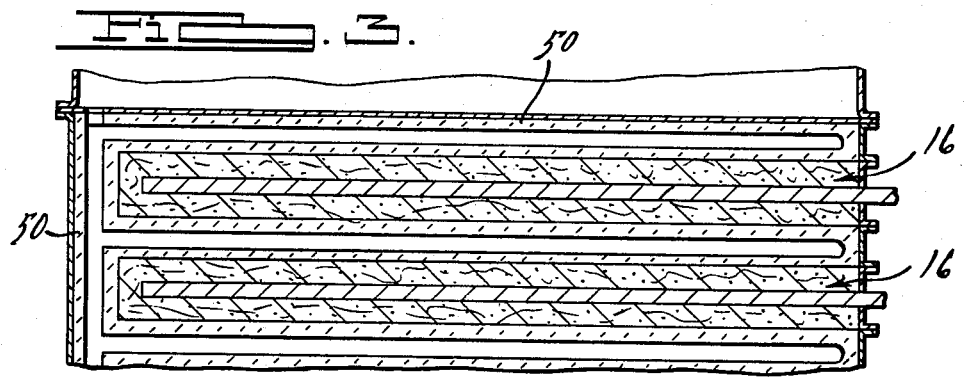
FIG. 3 is a side elevation view in cross-section showing an alternate embodiment of the battery of this invention.

FIG. 3 shows an alternate embodiment of the sodium sulfur battery 10 of this invention. In this situation, the only difference in the construction is that the additional ceramic material 50 such as beta alumina or beta" alumina is used as a lining against the metal used to define the exterior for that portion of the battery surrounding the individual sulfur electrodes 16—16.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. A sodium sulfur battery which comprises:

a plurality of box shaped sulfur electrodes, the outer surfaces of each of said electrodes being defined by an electrolyte material, each of said electrodes having length and width dimensions substantially greater than the thickness dimension thereof, each of said sulfur electrodes having an upwardly facing surface and downwardly facing surface;

electrode means contained in each of said box shaped sulfur electrodes, said electrode means for providing electrical access to each of said sulfur electrodes to an external electric circuit;

structure means for holding said plurality of box shaped sulfur electrodes in a stacked condition with an upwardly facing surface of one sulfur electrode in facing relationship to a downwardly facing surface of one sulfur electrode thereabove with a small thickness dimension separating the same, a volume thereby being defined between each pair of upwardly facing and downwardly facing surfaces of said sulfur electrode;

a reservoir means for containing sodium;

manifold means for connecting said volumes between said facing sulfur electrodes to said reservoir means; and metering means for controlling the flow of sodium between said reservoir means and said manifold means.

2. The sodium sulfur battery of claim 1 wherein:
said electrolyte material defining said box shape of said sulfur electrodes is formed as a single unit.

3. The sodium sulfur battery of claim 1 wherein:
said electrolyte material defining said box shape of said sulfur electrodes is formed of several pieces of electrolyte bonded together to form a single unit.

4. A sodium sulfur cell which comprises:

a plurality of box shaped sulfur electrodes, said electrodes having a rectangular outside cross-section with the length and the width dimensions thereof being substantially greater than the thickness dimension thereof, the outside surface of each of the cells being formed from an electrolyte material which can pass sodium ions therethrough, each of said electrodes containing therein an electrode and a porous mat material; and structure means for holding said plurality of box shaped sulfur electrodes in a stacked condition with an upper surface of an individual electrode facing a lower surface of an electrode thereabove with a relatively small volume therebetween, said small volume being designed to be filled by sodium and having a relatively small thickness dimension representing the distance between upper and lower surfaces of said electrodes.

* * * * *